Aug. 20, 1935.                H. J. LUFF                2,011,721
                           WASTE PIPE FITTING
                           Filed Oct. 5, 1934
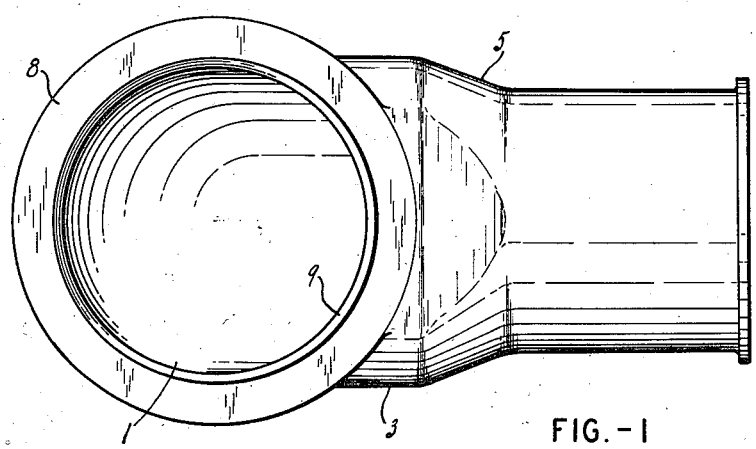
FIG.-1
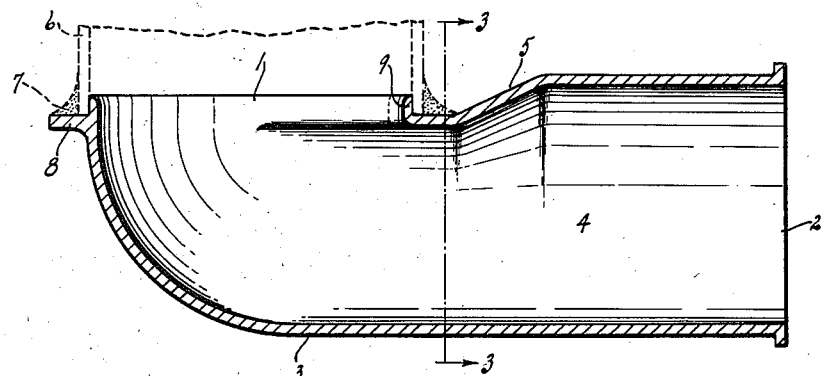
FIG.-2
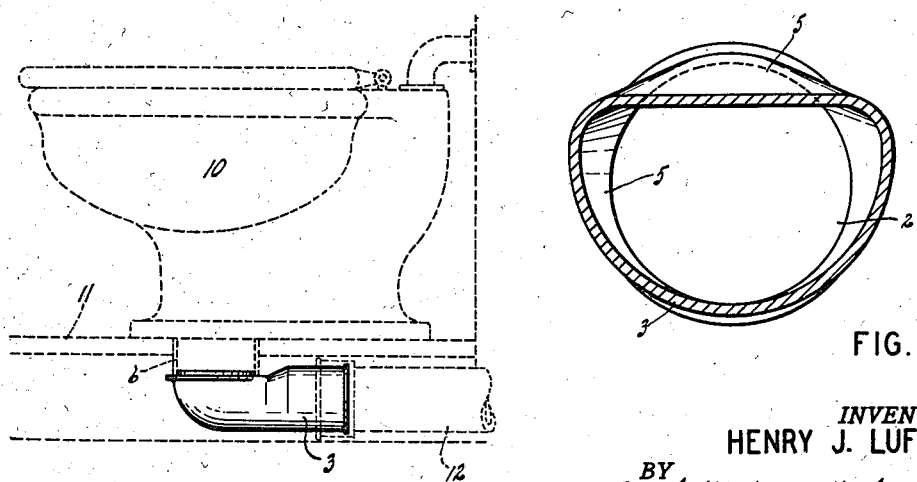
FIG.-3
FIG.-4
INVENTOR
HENRY J. LUFF
BY
Brockett, Hyde, Higley & Meyer
ATTORNEYS Patented Aug. 20, 1935

2,011,721

UNITED STATES PATENT OFFICE 2,011,721

WASTE PIPE FITTING

Henry J. Luff, Cleveland Heights, Ohio, assignor to Mary A. M. Luff, Cleveland Heights, Ohio Application October 5, 1934, Serial No. 747,020

6 Claims. (Cl. 137—75)

This invention relates to waste pipe elbow fittings for employment in waste line plumbing in connection with plumbing fixtures such as water closets and the like.

The standard outlet opening of such a fixture, is of greater size than necessary for the waste line leading therefrom.

Further, the waste line leads horizontally within the floor upon which the fixture rests, so that the horizontal stretch of the elbow fitting is definitely located, close to the fixture. Yet a lead connection is usually required between the fixture and the elbow fitting, so that the fitting inlet should be as remote beneath the fixture outlet, as possible.

The objects of this invention are to provide a waste pipe fitting of novel form which will meet the above conditions in a more satisfactory manner than has heretofore been accomplished, and more specifically to provide a fitting having a larger inlet than outlet, yet presenting a substantially uniform sectional area for flow through the fitting, wherein the general plane of the inlet is lower than the uppermost part of the outlet.

The exact nature of the invention together with further objects and advantages thereof will be apparent from the following description taken in connection with the accompanying drawing, in which Fig. 1 is a plan view of an embodiment of the invention; Fig. 2 is a typical vertical section therethrough, indicating in broken lines the nature of inlet connection to be employed in the embodiment illustrated; Fig. 3 is an elevation in transverse section as in the plane of line 3—3, Fig. 2; and Fig. 4 is an assembly view illustrating the manner of employment of the fitting.

With reference now to the drawing, the fitting is of metal, preferably brass or the like. It has inlet and outlet openings 1 and 2 respectively, disposed in planes at right angles to each other, so that the fitting has the general characteristics of a 90° elbow. The inlet and outlet openings are circular and the inlet is of larger diameter than the outlet, standard dimensions at these points being four inches diameter for the inlet and three inches diameter for the outlet. The general plane of the inlet opening intersects the outlet opening; this plane is lower than the upper extremity of the outlet opening. The body of the fitting generally indicated at 3, thus includes a horizontal stretch generally indicated at 4 and leading directly toward the outlet opening 2, the plane of the inlet opening 1 extending lengthwise within this stretch 4.

Adjacent the inlet opening 1 the stretch 4 has its side parts tangential to the inlet opening. The stretch 4, at its other end, adjacent the outlet opening 2, is of circular section. Thus the width of the stretch 4 decreases from the inlet opening 1 to the outlet opening 2. Owing to the low elevation of the inlet 1 with respect to the outlet opening, the fitting immediately adjacent the inlet opening has less vertical dimension in sectional passage area than at its outlet opening 2, as indicated in Figs. 2 and 3. As indicated in Fig. 2, the bottom of the fitting extends straight with a curve from the outer edge of the inlet opening tangent to the bottom of the stretch 4, which in turn leads directly to the outlet opening 2. Also, as indicated in Fig. 2, at the inside of the bend the stretch 4 at its top has a slope in the zone 5 leading generally from the inlet opening elevation to that of the top of the outlet opening. The change in width of the fitting, also, is provided in this zone 5, as indicated in Fig. 1. Thus through the zone 5 in the direction of flow, the fitting provides a passage area of decreasing width but increasing height. While in the manifold illustrated this zone 5 wherein these changes of proportions take place, is relatively short and generally adjacent the inlet opening 1, it will be appreciated that the zone might have greater extent, up to, as a maximum, the entire length of the stretch 4. In any event the proportioning and arrangement—that is, the relation of width to height in section transverse to the direction of flow—is such that the passage area is substantially constant throughout the stretch 4 so that flow through the fitting may have constant velocity substantially from entry into the inlet opening 1 to exit from the outlet opening 2.

The inlet opening illustrated is one adapted for connection employing a lead thimble 6 leading from the fixture served by the fitting, and employing a wiped joint as indicated at 7. Thus the fitting is here indicated as provided with a flange 8 annular about the inlet opening and merging, at the inside of the bend, with the upper wall part of the stretch 4. The upper face of the flange 8 is finished, the finish including the outer face of this upper wall part as indicated in Figs. 1 and 2. The inlet opening 1 also includes, when this type of joint is to be employed, a lip 9 extending slightly above the flange 8, and finished outside.

It will be appreciated, however, that while the fitting here shown is adapted for the described form of inlet connection, its inlet opening 1 may be formed, within the skill of the art, for any of the other types of connection known to the art.

The manner of employment of the invention will be obvious to one skilled in the art and is illustrated conventionally in Fig. 4, in which 10 represents a water closet supported on floor 11 within which is located the waste pipe fitting 3. The fitting 3 has connection with the fixture 10 by a lead thimble 6, and at its outlet end is arranged to deliver into the first section 12 of the usual waste line.

While as illustrated, the stretch 4 is cylindrical adjacent the outlet opening 2, and its change of sectional characteristics is confined to the relatively short zone 5 adjacent the inlet opening 1, it will be appreciated that the zone 5 might within the scope of my invention be extended over substantially the entire length of the stretch 4, leaving no substantial part of the stretch of cylindrical section. The illustrated form is preferable, however, for service with the type of connection illustrated in Fig. 4, and also because it permits shortening of the fitting by trimming from its outlet end, when necessary.

What I claim is:

1. In a waste pipe elbow fitting having a body with circular inlet and outlet openings, said body including a stretch leading toward said outlet opening, and said inlet opening being of greater diameter than said outlet opening and disposed in a plane intersecting said outlet opening, said stretch being flatter and wider adjacent said inlet than adjacent said outlet opening, and the parts being so proportioned that the passage area for flow through said fitting shall nowhere be less than adjacent said outlet opening.

2. In a waste pipe elbow fitting having a body with circular inlet and outlet openings, said body including a stretch leading toward said outlet opening, and said inlet opening being of greater diameter than said outlet opening, and disposed in a plane intersecting said outlet opening, said stretch adjacent said inlet opening, having its side parts tangential to the latter and therebetween a part leading from said inlet opening in the plane thereof, said stretch parts being so proportioned that the passage area for flow through said fitting shall nowhere be less than adjacent said outlet opening.

3. In a waste pipe elbow fitting having a body with circular inlet and outlet openings, said body including a stretch leading toward said outlet opening, and said inlet opening being of greater diameter than said outlet opening, and disposed in a plane extending lengthwise within said stretch, said stretch adjacent said inlet opening, having its side parts tangential to the latter and therebetween a part leading from said inlet opening in the plane thereof, said stretch parts being so proportioned that the passage area for flow through said fitting shall nowhere increase with advance toward said outlet opening.

4. In a waste pipe elbow fitting having a body with circular inlet and outlet openings, said body including a stretch leading toward said outlet opening, and said inlet opening being of greater diameter than said outlet opening and disposed in a plane intersecting said outlet opening, said stretch being flatter and wider adjacent said inlet than adjacent said outlet opening, the parts being so proportioned that the passage area for flow through said fitting shall nowhere be less than adjacent said outlet opening, said stretch being continuously cylindrical throughout a zone adjacent said outlet opening and having its change in sectional characteristic confined to a zone toward the inlet from said cylindrical zone.

5. In a waste pipe elbow fitting having a body with circular inlet and outlet openings, said body including a stretch leading toward said outlet opening, and said inlet opening being of greater diameter than said outlet opening and disposed in a plane intersecting said outlet opening, said stretch being flatter and wider adjacent said inlet than adjacent said outlet opening, the parts being so proportioned that the passage area for flow through said fitting shall nowhere increase with advance toward said outlet opening, said stretch being continuously cylindrical through a substantial portion of its length adjacent said outlet opening, and having its change in sectional characteristic confined to a relatively short zone adjacent said inlet opening.

6. In a waste pipe elbow fitting having a body with circular inlet and outlet openings, said body including a stretch leading toward said outlet opening, and said inlet opening being of greater diameter than said outlet opening and disposed in a plane intersecting said outlet opening, said stretch adjacent its inlet opening, having its side parts tangential to the latter and therebetween a part leading from said inlet opening in the plane thereof, said body having an annular flange about said inlet opening, said flange merging into said stretch at the inside of the elbow.

HENRY J. LUFF.